(12) United States Patent
Challoner et al.

(10) Patent No.: US 10,527,419 B1
(45) Date of Patent: Jan. 7, 2020

(54) BASEBAND CONTROL ELECTRONICS FOR INERTIAL WAVE ANGLE GYROSCOPE

(71) Applicants: Anthony Dorian Challoner, Manhattan Beach, CA (US); Parsa Taheri-Tehrani, Davis, CA (US); David Horsley, Berkeley, CA (US)

(72) Inventors: Anthony Dorian Challoner, Manhattan Beach, CA (US); Parsa Taheri-Tehrani, Davis, CA (US); David Horsley, Berkeley, CA (US)

(73) Assignees: Inertialwave, Manhattan Beach, CA (US); The Regents of the University of California, Oakland, CA (US)

( * ) Notice: Subject to any disclaimer, the term of this patent is extended or adjusted under 35 U.S.C. 154(b) by 173 days.

(21) Appl. No.: 15/436,726

(22) Filed: Feb. 17, 2017

Related U.S. Application Data

(60) Provisional application No. 62/296,300, filed on Feb. 17, 2016.

(51) Int. Cl.
*G01C 19/5684* (2012.01)

(52) U.S. Cl.
CPC .................................. *G01C 19/5684* (2013.01)

(58) Field of Classification Search
CPC .................................................. G01C 19/5684
See application file for complete search history.

(56) References Cited

U.S. PATENT DOCUMENTS

| | | | | |
|---|---|---|---|---|
| 4,951,508 A | * | 8/1990 | Loper, Jr. | G01C 19/5691 73/1.84 |
| 5,712,427 A | * | 1/1998 | Matthews | G01C 19/5691 73/1.37 |
| 7,437,253 B2 | | 4/2008 | Shcheglov | |

(Continued)

OTHER PUBLICATIONS

Challoner et al., "Boeing disc resonator gyroscope" in 2014 IEEE/ION Position Location and Navigation Symposium, PLAN2014, May 5, 2014- May 8, 2014, Monterey CA, pp. 504-514.

(Continued)

*Primary Examiner* — Manuel L Barbee
*Assistant Examiner* — Raymond L Nimox
(74) *Attorney, Agent, or Firm* — Canady & Lortz LLP; Bradley K. Lortz

(57) ABSTRACT

A compact Inertial Wave Angle Gyroscope (IWAG) is operated using a phase lock loop to track resonator phase and a baseband regulator to null quadrature. The resonator velocity or its components computed from precession angle are first determined at baseband and then applied to gain matrices in order to generate the feedback control forces for self-precession, cancellation of damping and compensation of anisodamping. The inertial rotation input is determined from the measured total precession angle by removing the computed or calibrated self-precession angle. The resonator energy can be regulated to a fixed magnitude and the baseband feedback force for self-precession at a fixed rate determined from components computed from precession angle such that the total force is in phase with baseband (Continued)

velocity but has fixed magnitude. The IWAG inertial rotation input can be determined from the measured total precession rate by removing the computed self-precession rate.

20 Claims, 15 Drawing Sheets

(56) References Cited

U.S. PATENT DOCUMENTS

| | | | | |
|---|---|---|---|---|
| 2004/0123661 A1* | 7/2004 | Painter | .................... | G01C 19/56 73/504.13 |
| 2005/0172714 A1 | 8/2005 | Challoner | | |
| 2006/0037417 A1* | 2/2006 | Shcheglov | ......... | G01C 19/5684 74/5.4 |
| 2007/0084042 A1* | 4/2007 | Challoner | .......... | G01C 19/5684 29/592.1 |
| 2007/0240508 A1* | 10/2007 | Watson | .................. | G01C 19/56 73/504.12 |
| 2008/0148846 A1* | 6/2008 | Whelan | .............. | G01C 19/5684 73/504.12 |
| 2014/0331740 A1* | 11/2014 | Okon | ................. | G01C 19/5776 73/1.77 |

OTHER PUBLICATIONS

Trusov et al., "mHRG: Miniature CVG with Beyond Navigation Grade Performance and Real Time Self-Calibration", in IEEE Inertial Sensors 2016, Laguna Beach, Feb. 23, 2016.

Lynch, "MRIG Frequency Mismatch and Quadrature Control", IEEE ISSIS 2014, Feb. 25, 2014.

Taheri-Tahrani et al., "Disk Resonator Gyroscope with Whole-Angle Operation", IEEE ISSIS 2015, Mar. 23-25, 2015.

IEEE STD 1431-2004, IEEE Standard Specification Format Guide and Test Procedure for Coriolis Vibratory Gyros.

Taheri-Tahrani et al., "A New Electronic Feedback Compensation Method for Rate Integrating Gyroscopes", IEEE ISSIS 2016, Feb. 23-25, 2016.

U.S. Appl. No. 15/170,918, Challoner.

Lynch, "MRIG Frequency Mismatch and Quadrature Control", 1st IEEE International Symposium on Inertial Sensors and Systems, Laguna Beach, Feb. 25-26, 2014.

* cited by examiner

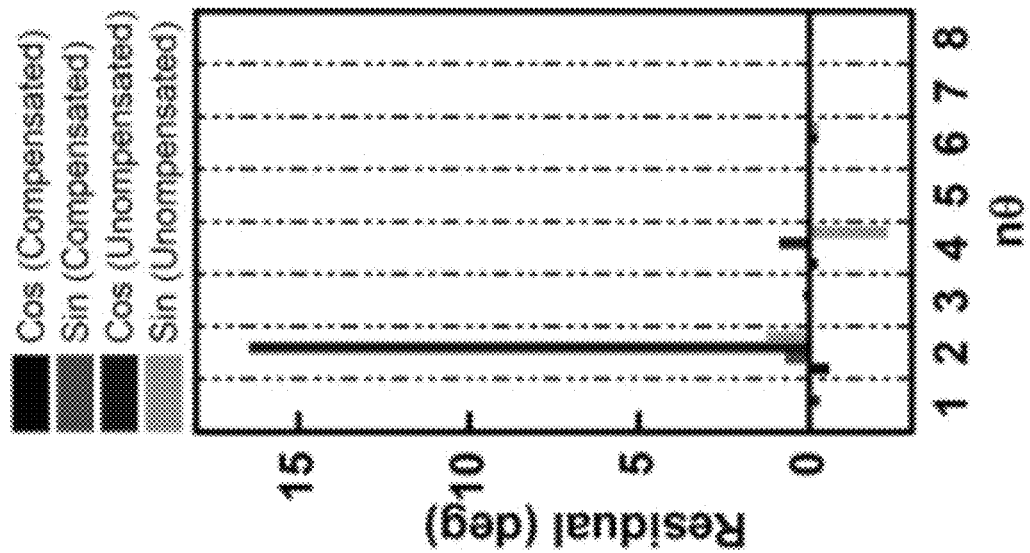
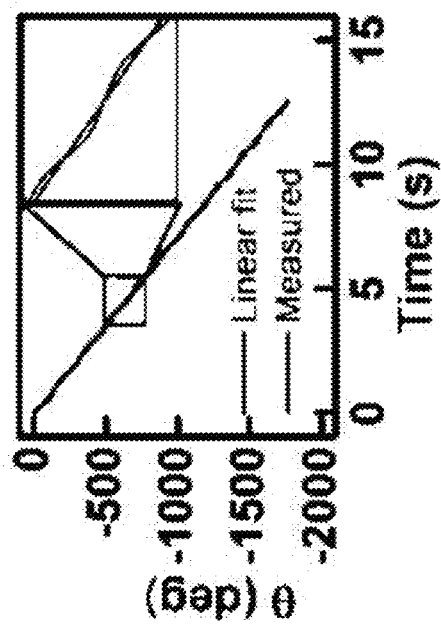
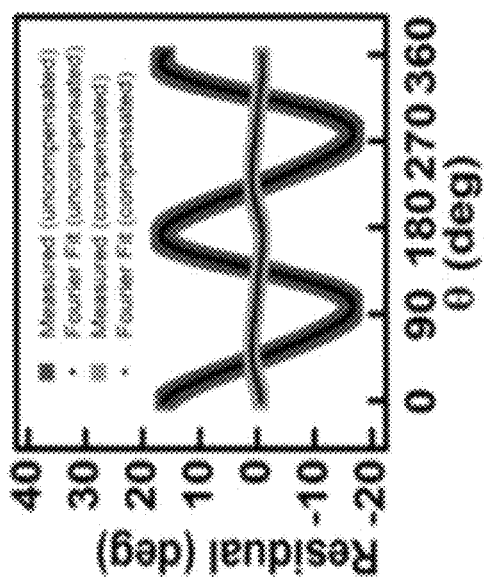
FIG. 7A
FIG. 7B
FIG. 7C

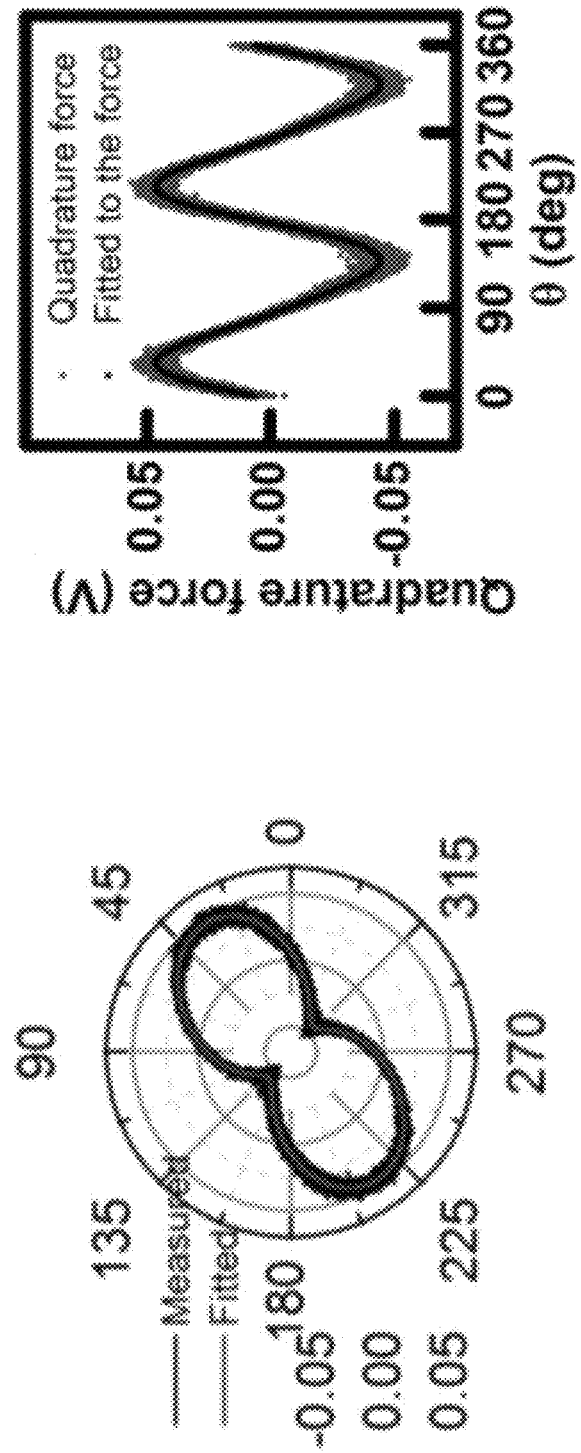
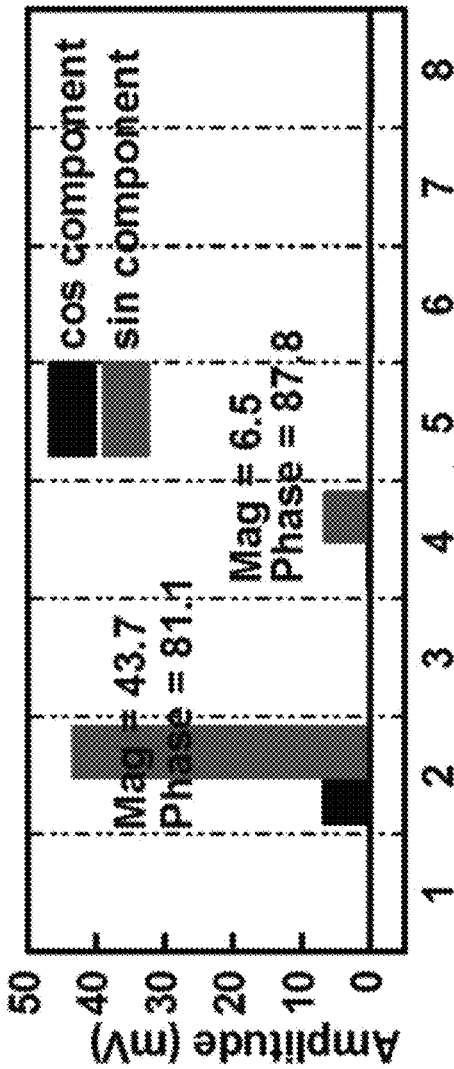
FIG. 10A
FIG. 10B
FIG. 10C

BASEBAND CONTROL ELECTRONICS FOR INERTIAL WAVE ANGLE GYROSCOPE

CROSS-REFERENCE TO RELATED APPLICATIONS

This application claims the benefit under 35 U.S.C. § 119(e) of the following U.S. provisional patent applications, which are incorporated by reference herein:

U.S. Provisional Patent Application No. 62/296,300, filed Feb. 17, 2016, and entitled "Inertial Wave Angle Gyroscope," by Challoner et al.

STATEMENT REGARDING FEDERALLY SPONSORED RESEARCH OR DEVELOPMENT

This invention was made with Government support under Grant No. W31P4Q-11-1-0003 awarded by the United States Government, Defense Advanced Research Projects Agency (DARPA). The Government has certain rights in the invention.

BACKGROUND OF THE INVENTION

1. Field of the Invention

The present disclosure relates to the operation of a compact vibratory gyroscope to measure the inertial orientation or angle of an object.

2. Description of the Related Art

There is a need for compact, low power gyroscopes without zero rate drift for improved navigation and pointing. A Coriolis Vibratory Gyroscopes (CVG) operated in rate mode contributes errors to navigation and pointing due to integration of rate noise and due to a practical bandwidth limitation in self-calibrating zero rate drift with only a single rate gyroscope. A CVG, operated in rate integrating gyro (RIG) or whole angle (WA) mode, e.g. Hemispherical Resonator Gyroscope (HRG) or Disc Resonator Gyroscope (DRG) measures precession angle, $\theta$ or rate $\dot{\theta}$, and not force to derive inertial rate as $\Omega = -k\dot{\theta}$, where k is the resonator angular gain factor. See FIG. 1A.

However, such a RIG has a rate threshold due to resonator mechanical stiffness asymmetry and zero rate drift due to errors in electronic correction or compensation of resonator damping asymmetry and uses complex, high power digital baseband control electronics including a phase lock loop to track resonator phase and to control amplitude and quadrature and correct or compensate for asymmetry based on precession angle. Microelectromechanical (MEMS) CVGs vs conventionally machined CVGs are compact but suffer greater asymmetry after micromaching and naturally higher rate thresholds, so that MEMS whole angle operation has only been used or demonstrated when there are high input rates. A method to overcome the larger asymmetry of MEMS CVGs and eliminate zero rate drift by operation as an Inertial Wave Rate Gyroscope measures the force to precess the vibration pattern at a high rate, exceeding the input rate alone. This Inertial Wave Gyroscope method with continually precessing vibration pattern overcomes any residual rate threshold and averages the effects of asymmetry on long term zero rate drift to zero, however it suffers the above noted limitations of rate gyroscopes due to rate noise from measurement of precession force and the complexity of another active control loop to regulate precession.

What is needed therefore is a method of operating a single Inertial Wave Angle Gyroscope (IWAG) that measures precession angle or rate not precession force or Coriolis force without a rate threshold or zero rate drift due to residual asymmetry. Furthermore, a simple IWAG electronics design is needed without the prior art high power, low-latency digital control loops to track resonator phase or regulate amplitude, quadrature or precession and suitable for compact ASIC electronics implementation and colocation with an approximately symmetric MEMS resonator and having low noise, high bandwidth, and high accuracy. Continual self-identification and correction of asymmetries is needed to correct the inherently larger MEMS initial asymmetries and maintain finely tuned correction or compensation errors to a very low level residual, within precession angle or rate measurement resolution. Finally, there is a need for techniques to implement an IWAG with electronics operating at baseband. These and other needs are met by the present invention as disclosed hereafter.

SUMMARY OF THE INVENTION

A compact Inertial Wave Angle Gyroscope (IWAG) is operated using a phase lock loop to track resonator phase and a baseband regulator to null quadrature. The resonator total velocity or its components computed from precession angle are first determined at baseband and then applied to gain matrices in order to generate the feedback control forces for self-precession, cancellation of damping and compensation of anisodamping. The inertial rotation input is determined from the measured total precession angle by removing the computed or calibrated self-precession angle. The resonator energy can be regulated to a fixed magnitude and the baseband feedback force for self-precession at a fixed rate determined from components computed from precession angle such that the total force is in phase with baseband velocity but has fixed magnitude. The IWAG inertial rotation input can be determined from the measured total precession rate by removing the computed self-precession rate. Baseband comprises the low frequency resonator motion signal components after amplitude demodulation of resonator position or velocity with respect to a reference that is in phase with the resonator vibration frequency. The reference can be generated by a phase lock loop.

In one example embodiment of the invention, a compact Inertial Wave Angle Gyroscope measuring precession angle or rate having no zero rate threshold or zero rate drift due to residual asymmetry comprises antisymmetric velocity feedback of sufficient magnitude to produce a continual self-precession of its vibration pattern. The inertial rotation rate input is determined from the measured total precession rate after subtracting the modeled or calibrated self-precession rate. The continual precession overcomes any rate threshold and eliminates rate drift at zero rate input by averaging the effects of its residual asymmetry to zero over each revolution of the precession pattern in the case.

A typical embodiment of the invention comprises a gyroscope including a resonator having residual asymmetry small enough to yield a defined self-precession rate of a vibration pattern of the resonator and readout electronics coupled to the resonator for generating the defined self-precession rate of the vibration pattern of the resonator. The readout electronics measure a total precession rate of the resonator, and subtract the defined self-precession rate from the measured total precession rate to yield an inertial rate output. The readout electronics compute feedback forces to induce the defined self-precession rate and compensate for the residual asymmetry at baseband with fixed gain and the feedback forces are applied at a resonator frequency in phase with resonator velocity. A force signal of the feedback forces can be modulated up to the resonator frequency by the readout electronics using a reference frequency generator that tracks a phase of the resonator comprises a phase lock loop. A velocity amplitude of the resonator can be regulated to a fixed value and the magnitude of the feedback force that induces the defined self-precession rate and is in phase with resonator velocity is also a fixed value with feedback force components determined from a precession angle digitally computed by the readout electronics at baseband.

The defined self-precession rate can be defined by a measurement of actual precession rate of the resonator with zero inertial rate input. Alternately, the defined self-precession rate can be defined by a model of the readout electronics and resonator.

In some embodiments, the readout electronics can be implemented in an application specific integrated circuit (ASIC). The readout electronics can generate the sufficient precession force employing analog electronic feedback including amplitude and quadrature control. The readout electronics can correct common mode damping and stiffness over temperature and time employing substantially fixed electronic feedback correction of damping asymmetry parameters and stiffness asymmetry parameters. In addition, the readout electronics can include an intermediate frequency processor for control offset correction, residual asymmetry parameter identification for analog feedback gain correction and electrostatic tuning bias correction and compensated digital inertial rate output.

In further embodiments, the readout electronics can reverse a direction of the defined self-precession rate. Reversal of the direction of the defined self-precession rate can be performed periodically or based on the resonator reaching a threshold precession angle.

Similarly, a typical method embodiment for operating a gyroscope comprises the steps of providing a resonator having residual asymmetry small enough to precess a vibration pattern of the resonator with a defined self-precession rate, generating the defined precession rate of the vibration pattern of the resonator with readout electronics coupled to the resonator, measuring a total precession rate of the resonator, and subtracting the defined self-precession rate from the measured total precession rate to yield an inertial rate output. The method embodiment can be modified consistent with any apparatus embodiments described herein.

BRIEF DESCRIPTION OF THE DRAWINGS

Referring now to the drawings in which like reference numbers represent corresponding parts throughout:

FIG. 7A is a graph of example gyro output with 200 dps rate applied with rate table;

FIG. 7B is a graph of example residual error before and after compensation;

FIG. 7C is a graph of Fourier components of error before and after compensation where the dominant error terms are $2\theta$ and $4\theta$ harmonics;

FIG. 10A is an example plot showing $2\theta$ dependence of the quadrature force measured and Fourier fit;

FIGS. 10B and 10C show example Fourier analysis of the quadrature force to find the primary axis of stiffness;

DETAILED DESCRIPTION

1. Overview

Figure 1A:
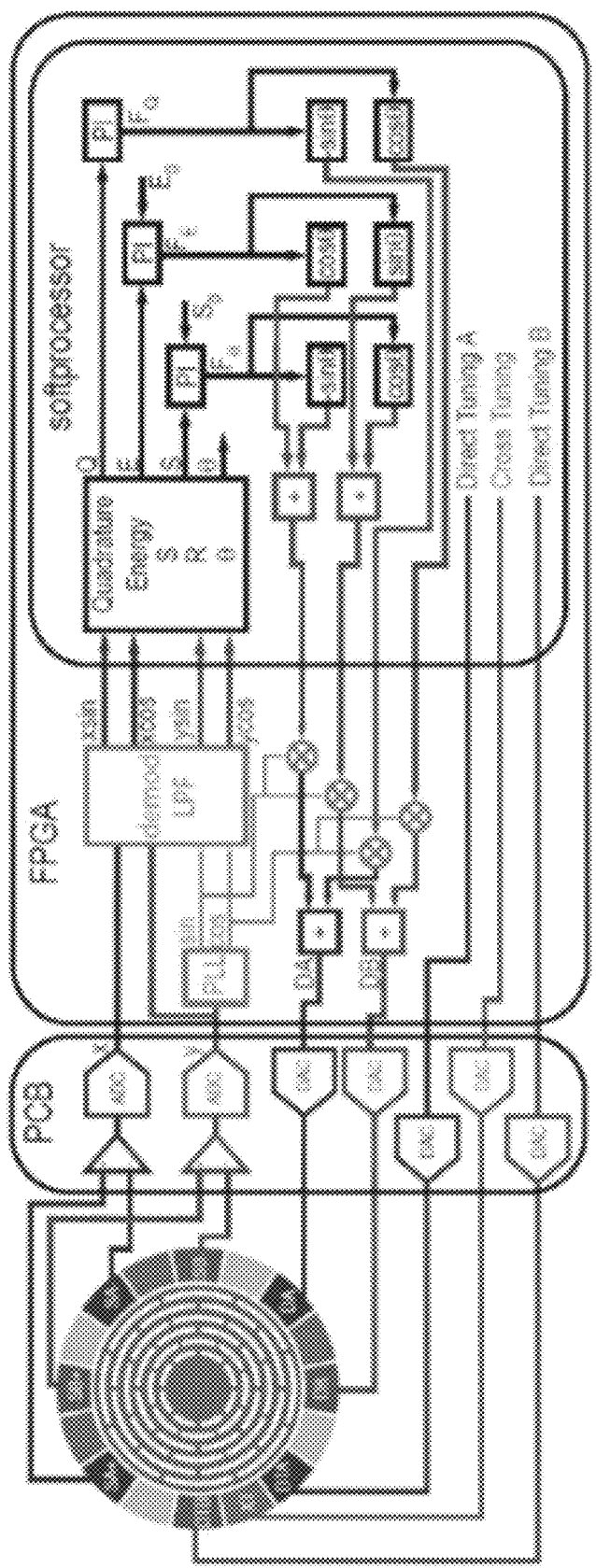
FIG. 1A is a block diagram of a prior art CVG, operated in rate integrating gyro (RIG) or whole angle (WA) mode.

As described above, it is an objective of the present disclosure to provide a single, compact, high bandwidth inertial wave angle gyroscope (IWAG) producing an inertial rate output without zero rate drift. In one example embodiment of the invention, an Inertial Wave Angle Gyroscope (IWAG) is described hereafter comprising a resonator with sufficiently small residual asymmetry after correction with electronic feedback and electrostatic forces to yield a defined self-precession rate of the vibration pattern of the resonator and readout electronics to generate a defined self-precession rate of the vibration pattern to measure inertial angle from total precession rate less the defined self-precession rate. Control of the IWAG can be implemented at baseband. (Baseband comprises the low frequency resonator motion signal components after amplitude demodulation of resonator position or velocity with respect to a reference that is in phase with the resonator vibration frequency; the reference can be generated by a phase lock loop.)

The IWAG can be operated using a phase lock loop to track resonator phase and a baseband regulator to null quadrature. The resonator velocity is first determined at baseband and then applied to gain matrices in order to generate the feedback control forces for self-precession, cancellation of damping and compensation of anisodamping. The inertial rotation input is determined from the measured total precession angle by removing the computed or calibrated self-precession angle. The resonator energy can be regulated to a fixed magnitude and the baseband velocity feedback force computed from precession angle such that it is in phase with baseband velocity but has fixed magnitude. The IWAG inertial rotation input can be determined from the measured total precession rate by removing the computed self-precession rate.

In order to produce a rate integrating gyroscope (RIG) without a minimum rate threshold and performance limited only by electrical and mechanical thermal noise, a generalized electronic feedback method for the compensation of resonator damping asymmetry (anisodamping) and stiffness asymmetry (anisoelasticity) can be described with a new method of RIG operation using self-precession. This technique, detailed in Section 7 hereafter, overcomes the precession angle-dependent bias error and minimum rate threshold, operating the resonator in baseband where the resonator motion signals after amplitude demodulation with respect to a reference that is in phase with the resonator vibration frequency; the reference is typically generated by a phase lock loop. To correct angle-dependent bias, the electronic feedback force of the amplitude regulator is augmented with a non-unity gain output distribution matrix selected to correct for anisodamping.

This technique is capable of decreasing the angle dependent bias error by a factor of 30, resulting a minimum rate threshold of 3.5 dps. To further improve RIG performance, an electronically-induced self-precession rate can be incorporated to lower the rate threshold. The RIG's output noise using this technique can yield an angle random walk (ARW) of 11 mdps/√Hz, similar to rate gyro operation at same amplitude.

2. Self-Precession

Figure 1B:
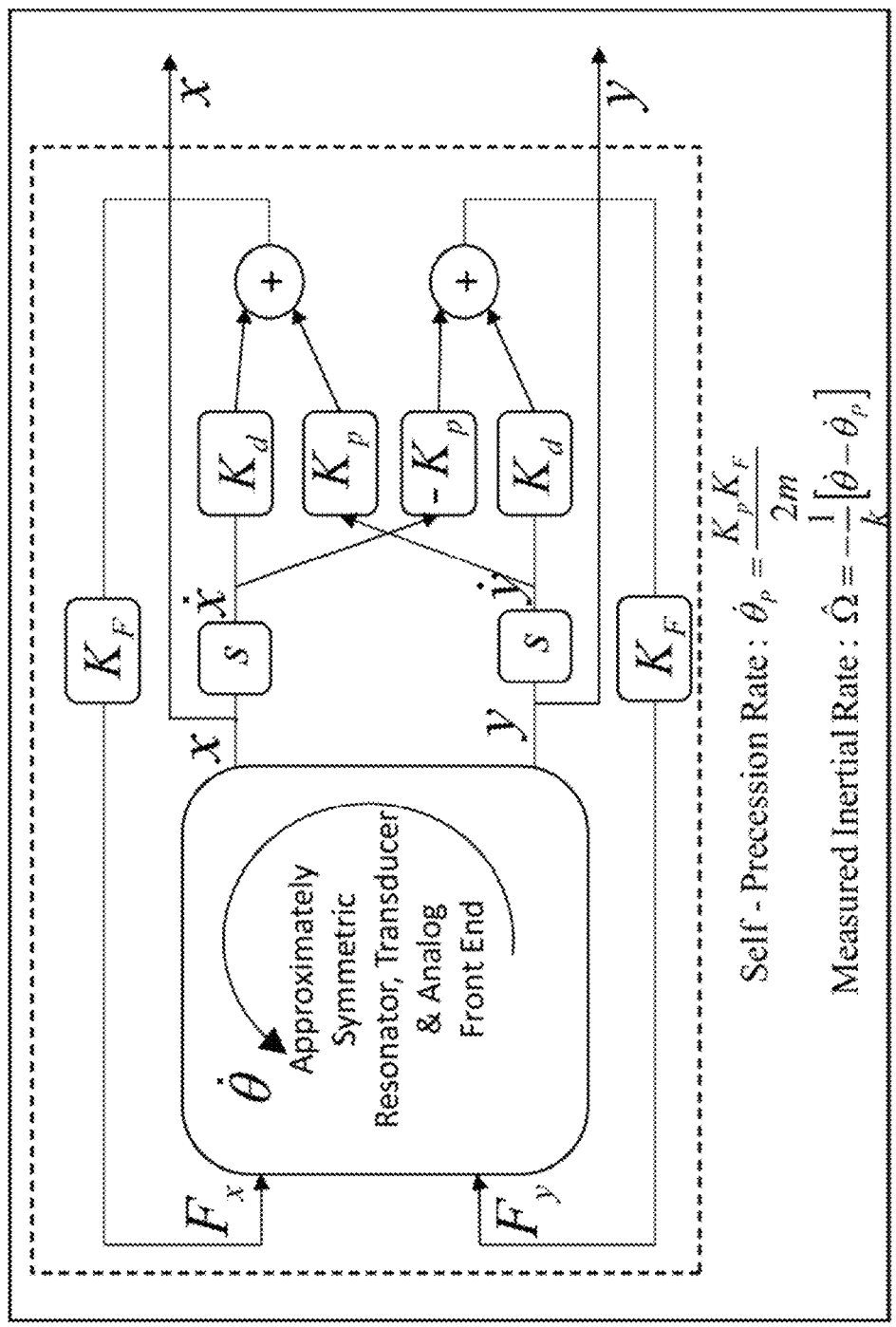
FIG. 1B illustrates velocity feedback control to sustain vibration and induce self-precession of an approximately symmetric resonator with transducers and front end electronics and the computation of inertial rate.

One example embodiment of the invention implementing self-precession is illustrated in FIG. 1B that shows an Inertial Wave Angle Gyroscope (IWAG) comprising a resonator having small residual asymmetry after mechanical trimming and application of electronically-determined correction forces, with transducers for sensing resonator motion and applying resonator forces, front-end electronics for sensing resonator vibration pattern position, x and y or velocity $\dot{x}$ and $\dot{y}$, and feedback control electronics to define resonator forces, Fx and Fy along two orthogonal resonator axes. The control electronics defines the velocity feedback forces to sustain the resonator vibration in the presence of passive damping and to define a self-precession rate of the vibration pattern without inertial rate input. Velocity feedback gain, $K_d$ is selected to cancel the passive damping using a practical automatic gain control method to be described in the sequel and sustain resonator vibration. Antisymmetric velocity feedback forces with gains $K_p$ and $-K_p$ are applied via force transducer gain $K_F$ to generate a defined self-precession rate $$\dot{\theta}_P = \frac{K_P K_F}{2m}$$

of the resonator vibration pattern with zero inertial rate input and sufficiently small residual asymmetry.

A measurement, $\hat{\Omega}$ of the inertial rate input, $\Omega$ is then determined from the measured vibration pattern precession rate, $\dot{\theta}$, the defined self-precession rate, $\dot{\theta}_P$ and the resonator angular gain, $$k, \text{ as } \hat{\Omega} = -\frac{1}{k}[\dot{\theta} - \dot{\theta}_P].$$

The defined self-precession rate $\dot{\theta}_P$ can be defined by a model of the resonator and readout electronics as above or from a measurement of total precession rate $\dot{\theta}$ with zero inertial rate input, i.e. $\Omega=0 \Rightarrow \dot{\theta}_P=\dot{\theta}$.

With the prior art RIG operation (as shown in FIG. 1A), even small residual asymmetry results in significant zero rate drift; with IWAG self-precession these rate errors average to zero over each vibration pattern revolution thus eliminating long term zero rate drift.

For example, a resonator vibrating with in-phase amplitude a and quadrature amplitude q, mechanical damping asymmetry $$\Delta\left(\frac{1}{\tau}\right),$$

uncorrected with electronic forces, with principal axis angle $\theta_\tau$, frequency asymmetry $\Delta\omega$ with principal stiffness axis at $\theta_\omega$, and with input rate $\Omega$ has a well-known pattern precession rate, without IWAG self-precession:

$$\dot{\theta} = -k\Omega - \frac{1}{2}\frac{a^2+q^2}{a^2-q^2}\Delta\left(\frac{1}{\tau}\right)\sin2(\theta-\theta_\tau) + \frac{aq}{a^2-q^2}\Delta\omega\cos2(\theta-\theta_\omega) \quad (1)$$

With zero inertial input rate, $\Omega=0$ we then have a model of the zero-rate bias for a conventional RIG:

$$\Omega_d = -\frac{\dot{\theta}}{k} = \frac{1}{2k}\frac{a^2+q^2}{a^2-q^2}\Delta\left(\frac{1}{\tau}\right)\sin2(\theta-\theta_\tau) - \frac{aq}{a^2-q^2}\frac{\Delta\omega}{k}\cos2(\theta-\theta_\omega) \quad (2)$$

With conventional quadrature nulling this leaves a residual angle dependent zero rate damping drift $$\Omega_d = \frac{1}{2k}\Delta\left(\frac{1}{\tau}\right)\sin2(\theta-\theta_\tau)$$

With MEMs large micro-machining errors it is desirable to correct this rate drift by matrix velocity feedback forces based on an estimate of the damping asymmetry parameters, e.g., $\Delta\left(\frac{1}{\tau}\right)$ and $\theta_\tau$.

With mean damping time constant, $\tau$, micro-machining errors $\delta_r$, damping asymmetry $$\Delta\left(\frac{1}{\tau}\right) \sim \frac{\delta_\tau}{\tau}$$

and electronic correction error, $\delta_e$ the zero rate drift, $$\Omega_d \approx \frac{\delta_e \delta_\tau}{2k\tau} \sin 2(\theta - \theta_\tau),$$

depending on the precession angle, $\theta$. For conventional RIG operation at zero inertial rate input the maximum zero rate damping drift $$\Omega_d \le \frac{\delta_e \delta_\tau}{2k\tau}.$$

For IWAG operation with a defined self-precession rate $$\dot\theta_P \gg \frac{\delta_e \delta_\tau}{2k\tau}$$

then $\theta \cong \dot\theta_P t$, to high accuracy based on simulation of typical MEMS cases so that $$\Omega_d \approx \frac{\delta_e \delta_\tau}{2k\tau} \sin 2(\dot\theta_P - \theta_\tau)$$

and so has the same maximum amplitude but is now time varying periodically at twice the self-precession rate so averages to zero every half precession period. Averaging over a long time period comprising approximately N precession periods to determine zero rate drift would yield an zero rate drift maximum $$\Omega_d \approx \frac{\delta_e \delta_\tau}{2k\tau} \frac{1}{2N}.$$

A significant reduction in zero rate drift over the prior art is thus possible using IWAG.

For example, a typical 0.6 mm DRG MEMS with $f = 250$ kHz, $Q = 120$K, $k = 0.8$, $\frac{1}{\tau} \approx \frac{\pi f}{Q} = 6.5$ r/s, $k$-$0.8$, $\delta_\tau \sim 0.01$ and $\delta_e = 0.001$ so that zero rate drift $$\Omega_d \le \frac{\delta_e \delta_\tau}{2k\tau} = 8.5$$

deg/h would be measured after long enough averaging to eliminate thermal noise. This noise is ~10 deg/h after 1 second and 1 deg/h after 100 second averaging. So after 100 seconds the conventional RIG maximum zero rate drift would remain 8.5 deg/h. On the other hand for example, with an IWAG defined self-precession rate $\dot\theta_p = 0.5$ Hz, then the zero rate drift would average to zero after each precession half-cycle with a maximum rate error $$\Omega_d \approx \frac{\delta_e \delta_\tau}{2k\tau} \frac{1}{2N} = 0.085 \text{ deg/h after } \sim 100 \text{ sec } (N = 50)$$

averaging, a potential 100× reduction in zero rate drift, absent the thermal noise of 1 deg/h. This motivates further reductions in thermal noise from electronic and mechanical sources to take full advantage of IWAG.

3. IWAG Application Specific Integrated Circuit (ASIC)

Figure 2:
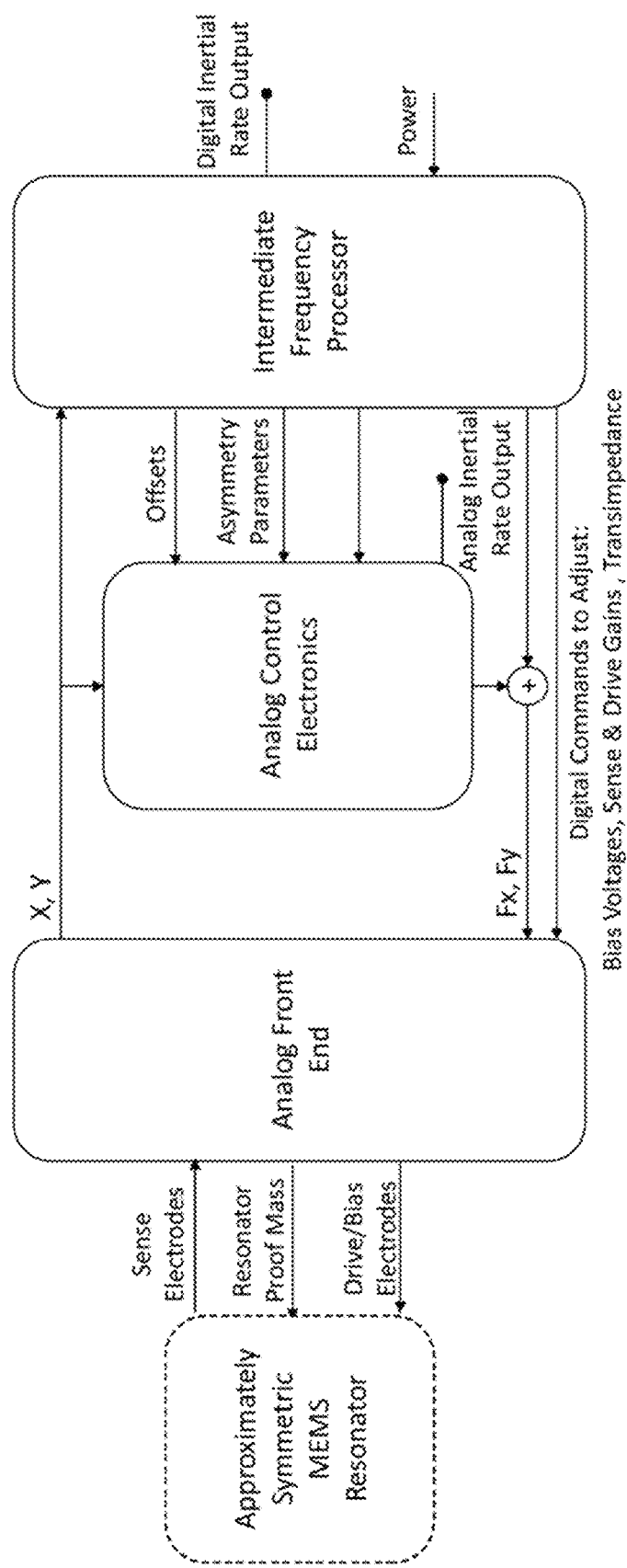
FIG. 2 is a block diagram of example IWAG ASIC electronics comprising Analog Front-End Electronics, Analog Control Electronics and Intermediate Frequency Processor to interface with the transducers of a MEMS resonator and produce analog and digital inertial rate outputs.

FIG. 2 is a block diagram of example IWAG ASIC electronics comprising Analog Front-End Electronics, Analog Control Electronics and Intermediate Frequency Processor to interface with the transducers of a MEMS resonator and produce analog and digital inertial rate outputs.

To implement IWAG self-precession with compact symmetric MEMS resonators the IWAG electronics in FIG. 2 is designed for implementation in a compact 180 nm CMOS ASIC process for low noise, low asymmetry correction or compensation error and low power. Both high bandwidth analog rate and high accuracy digital rate output are provided. This electronics design is suitable for collocation with the MEMS for low interconnection noise and common temperature. The latter enables use of resonator frequency to compensate electronics and mechanical sources of rate drift over temperature. A low-noise Analog Front End (AFE) interfaces with symmetric MEMS transducers for sense, drive and resonator biasing and outputs resonator analog position X and Y in response to analog control force inputs Fx and Fy. These forces are generated by the low power Analog Control Electronics (ACE) to provide self-precession, amplitude and quadrature control as well as damping and stiffness asymmetry feedback correction and wideband analog inertial rate output. This use of analog control and wideband analog rate together with precession parameter determination at intermediate frequency in the Intermediate Frequency Processor (IFP) removes the prior art requirement for low-latency digitization with digital feedback control and a phase lock loop to track resonator phase. This enables low power digitization with high resolution and linearity and subsequently high precision in parameter extraction and low numerical noise contribution.

4. Analog Front End

Figure 3:
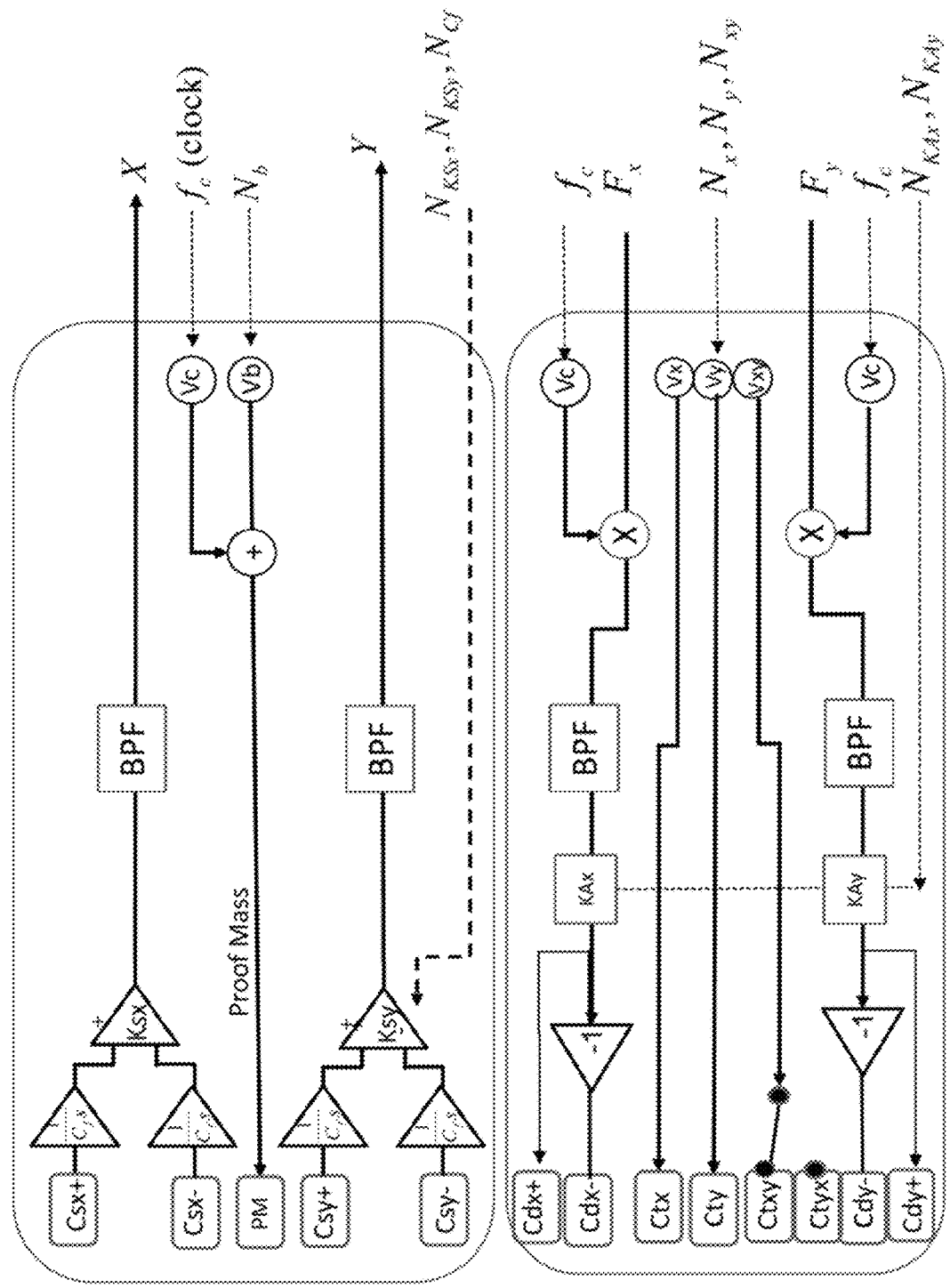
FIG. 3 is a block diagram of example Analog Front-End Electronics interfacing with a resonator with capacitive transducers and generating output voltages, X and Y proportional to resonator position on two axes.

FIG. 3 is a block diagram of example Analog Front-End Electronics interfacing with a resonator with capacitive transducers and generating output voltages, X and Y proportional to resonator position on two axes.

Five sense capacitance connections are provided for resonator proof mass bias or excitation and differential sense of MEMS resonator X and Y position. ASIC top metal or thermally matched glass interposer metal is preferably used to interconnect these five pads with the bonded silicon MEMS capacitance transducer array for lowest parasitic capacitance. Transcapacitance buffer differential pairs for each axis provide low noise pick off <10 zF/rt-Hz. Overall sense gain level and symmetry are set by initial laser trim or digital adjustments $N_{Ksx}$, $N_{KSy}$ and $N_{Cf}$ from the IFP. Resonator proof mass bias voltage Vb is fixed or DAC adjusted $N_b$. An optional carrier Vc with frequency fc can be added to shift the resonator sense frequency from f to f+/−fc to eliminate parasitic drive noise by use of Electronic Amplitude Modulation (EAM).

Four drive capacitance connections in two differential pairs are provided to apply forces Fx and Fy to drive the resonator vibration on X and Y axes. Four tuning bias capacitance connections provide direct and cross axis electrostatic stiffness adjustments to reduce frequency asymmetry or quadrature. Initial laser trim or high resolution, e.g. 20 bits, commanded DAC levels ($N_x$,$N_y$,$N_{xy}$) from the IFP are used to adjust bias voltages Vx, Vy, Vxy. Overall drive attenuator level and symmetry are set by initial laser trim or digital adjustments $N_{KAx}$, $N_{KAy}$ from the IFP. Resonator proof mass bias voltage Vb is fixed or DAC adjusted $N_b$. An optional carrier Vc with frequency fc can be used to shift the ACE feedback forces Fx and Fy generated at intermediate frequency f+/−fc back to f for resonator control.

5. Analog Control Electronics

Figure 4:
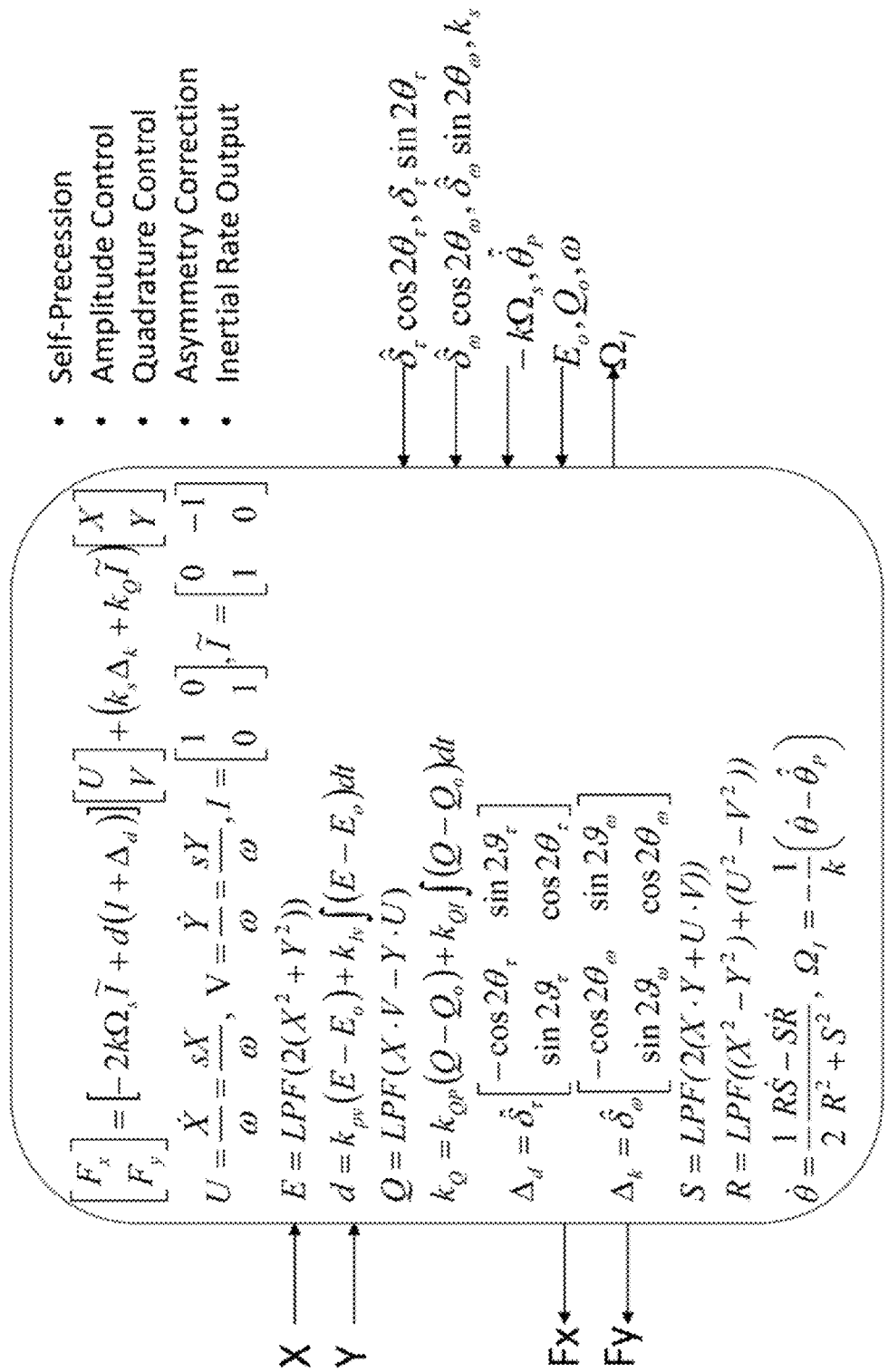
FIG. 4 is a detailed diagram of example Analog Control Electronics defining continuous time analog functions to process input voltages X and Y and generate the feedback control force signal outputs, Fx and Fy and an analog voltage signal $\Omega_I$, representing analog inertial rate.

FIG. 4 is a detailed diagram of example Analog Control Electronics defining continuous time analog functions to process input voltages X and Y and generate the feedback control force signal outputs, Fx and Fy and an analog voltage signal $\Omega_I$, representing analog inertial rate.

The continuous analog functions to induce a prescribed self-precession rate, $\dot{\theta}_P=-k\Omega_P$, control amplitude and quadrature and correct damping and stiffness asymmetry and to output analog inertial rate are defined in FIG. 4. Normalized resonator velocities, U and V can be derived from position X and Y with a capacitive input operational amplifier and updated resonator frequency value a derived by the IFP. Antisymmetric velocity feedback with prescribed gain Kp=−2 k$\Omega_P$ provides the self-precession force. To regulate amplitude or energy E to prescribed level Eo, automatic gain control is used with proportional and integral control to generate common mode damping gain estimate d distributed via gain matrix (I+$\Delta_d$) to correct damping asymmetry. To regulate quadrature Q to a prescribed level Qo, automatic gain control is used with proportional and integral control to generate position gain estimate $k_Q$ distributed via antisymmetric matrix $\hat{1}$. Stiffness asymmetry is corrected by symmetric matrix velocity feedback with common gain ks and the two stiffness asymmetry parameters updated from the IFP.

Inertial rate is derived from parameters S and R using analog multiplication, derivatives and summing as shown and with quadrature nulling the denominator becomes a constant value obviating need for analog division. The actual calibrated self-precession rate, $\dot{\theta}_P$ is updated from the IFP. The angular gain factor, k is dependent only on resonator shape so does not need to be adapted but rather can be applied to the analog output as a scale factor correction by the user.

6. Intermediate Frequency Processor

Figure 5:
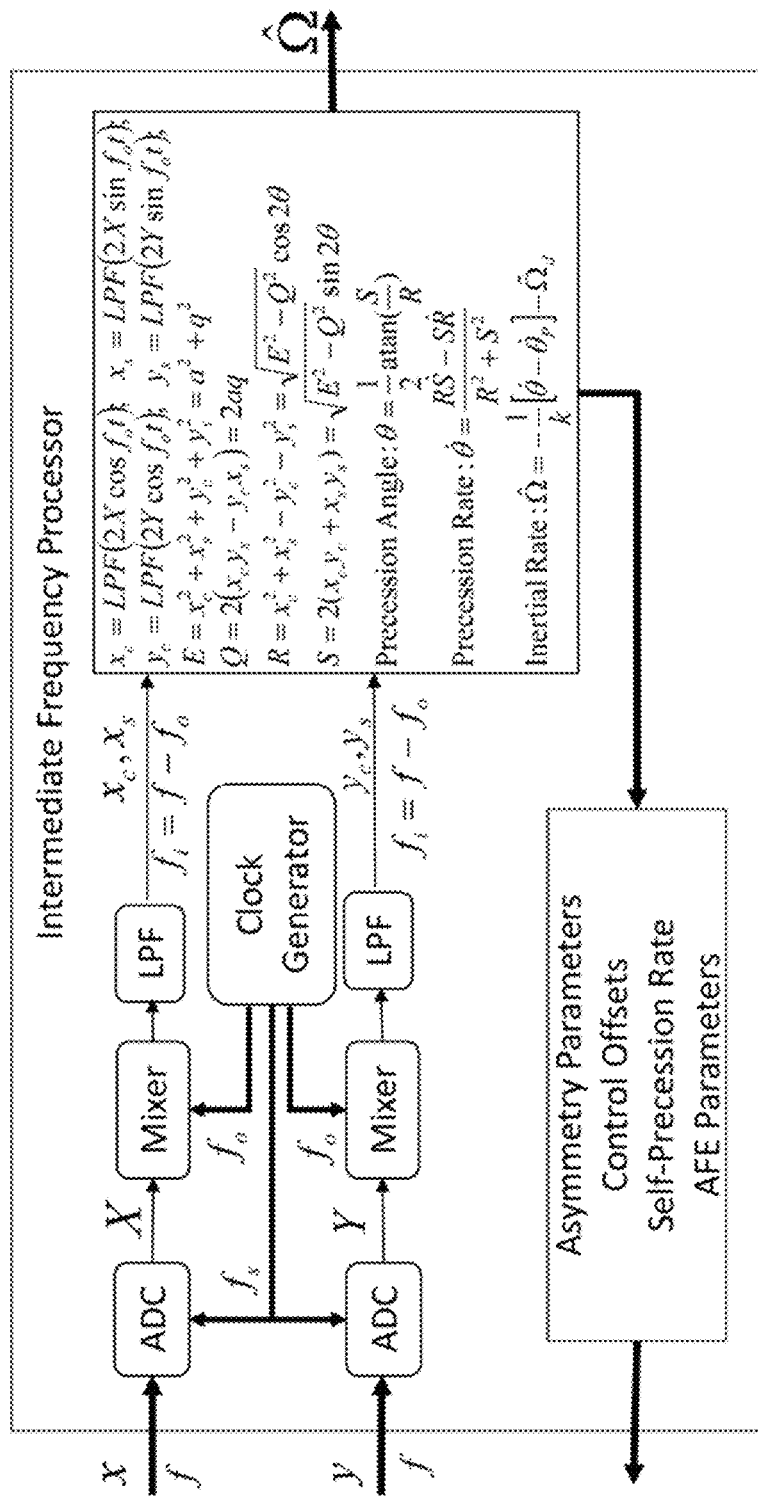
FIG. 5 is a block diagram of example intermediate frequency digital processing electronics to determine the precession rate and remove the self-precession rate to determine inertial rate input.

FIG. 5 is a block diagram of example intermediate frequency digital processing electronics to determine the precession rate and remove the self-precession rate to determine inertial rate input;

Computation of precession angle and parameters of the precession motion at an intermediate frequency, fi to yield precession angle and digital inertial rate output as defined in FIG. 5. An analog-to-digital converter (ADC) samples each sense transducer output, X and Y based on a generated (or external) sample clock frequency, $f_s$. The output of each ADC is mixed down with digital sine and cosine signals at local oscillation frequency $f_o$=f−fi<$f_s$/2 resulting in intermediate frequency sine and cosine signals xc and xs, and yc and ys, proportional to the original modulation of x and y, respectively. The conventional parameters of the precession motion, E, Q, R and S or a, q and θ previously derived at baseband are computed with simple Nyquist sampled digital signal processing without the need for a high speed digital phase lock loop to track resonator phase. Digital computation of E and Q parameters are used to correct offsets, Eo and Qo in analog amplitude and quadrature control loops.

Fourier analysis of the motion parameters at constant inertial input rate is used to initially define and periodically maintain the damping and stiffness asymmetry parameters for use in asymmetry correction or inertial rate compensation. For instance in light of equation (1) with quadrature nulled to zero and zero or constant rate input the damping asymmetry parameters can be computed from the amplitude and phase of the $2^{nd}$ harmonic of the precession rate variation vs precession angle. These damping parameters can be updated to the ACE for feedback correction or the precession angle dependent rate bias model, $\Omega d$ in equation (1) can be used to compensate the final inertial rate output.

With a finite quadrature value, determined from E and Q and with damping asymmetry corrected the precession rate model equation (1) with zero or constant rate can be used to identify the stiffness asymmetry parameters from the amplitude and phase of the $2^{nd}$ harmonic of the precession rate variation vs precession angle. These stiffness asymmetry parameters can be updated in the ACE for feedback correction of asymmetry or used to update the tuning biases in the AFE for electrostatic stiffness correction. Alternatively the zero rate drift model equation (2) can be used to compute an output rate bias compensation $\Omega_d$.

Resonator frequency for update of value ω to the ACE or as a thermometer for use in temperature compensation or regulation can be determined from the rate of change of phase angle defined by the position components $x_s$ and $x_c$ or $y_s$ and $y_c$.

7. Implementing IWAG Operation in Baseband

In order to produce a rate integrating gyroscope (RIG) without a minimum rate threshold and performance limited only by electrical and mechanical thermal noise, a generalized electronic feedback method for the compensation of resonator damping asymmetry (anisodamping) and stiffness asymmetry (anisoelasticity) can be described with a new method of RIG operation using self-precession. This technique overcomes the precession angle-dependent bias error and minimum rate threshold. To correct angle-dependent bias, the electronic feedback force of the amplitude regulator is augmented with a non-unity gain output distribution matrix selected to correct for anisodamping. This method is capable of decreasing the angle dependent bias error by a factor of 30, resulting a minimum rate threshold of 3.5 dps. To further improve RIG performance, an electronically-induced self-precession rate can be incorporated to lower the rate threshold. The RIG's output noise using this technique can yield an angle random walk (ARW) of 11 mdps/√Hz, similar to rate gyro operation at same amplitude.

As previously described, MEMS vibratory gyroscopes operate based on Coriolis force coupling between two distinct resonance modes of a single resonator and can be divided to two operational modes: 1-rate mode (RG) in which angular rate is measured and 2-rate integrating mode (RIG) in which the angle is measured. In RG, one of the resonance modes is driven as the drive mode and the Coriolis force caused by rotation induces vibration in the other resonance mode whose amplitude gives a measure of rotation rate. On the other hand, in RIG, both modes are driven, so an angle dependent energy controller, or more generally viewed as common mode velocity feedback, can be implemented to allow free precession of vibration angle between two resonance modes. In RG, the scale factor is dependent on Q factor of the sense mode and vibration amplitude of the drive mode, and increasing either of them will increase scale factor and as result decrease noise (ARW) of the gyroscope. Unlike RG, in RIG, the scale factor is independent of quality factor and the amplitude of vibration, and is only dependent on geometry of the resonator through Coriolis coupling between two resonance modes known as angular gain.

Major sources of error in RIG comes from anisoelasticity and anisodamping. The former can be traditionally solved using a quadrature cancellation loop, which can also be employed with embodiments of the present invention. As previously described, embodiments of the present invention can employ a disk resonator gyroscope (DRG) with a ring-down time 10,000 times shorter (0.1 s), frequency 50 times higher (250 kHz) and resonator volume 1,875,000 times smaller than the classical 30 mm quartz HRG (600 μm in diameter) in whole-angle mode operation, with an electronic feedback method for anisodamping compensation. The control algorithms can be implemented at baseband using a modification of a controller using the method of averaging. In addition, a method of RIG operation with a continual self-precession rate can facilitate identification and compensation of general anisotropy, improve gyroscope performance and eliminate the threshold rate. Furthermore, the noise characterization of RIG is comparable to RG performance of the same device.

7.A. Control Approach for IWAG Operation in Baseband

Figure 6A:
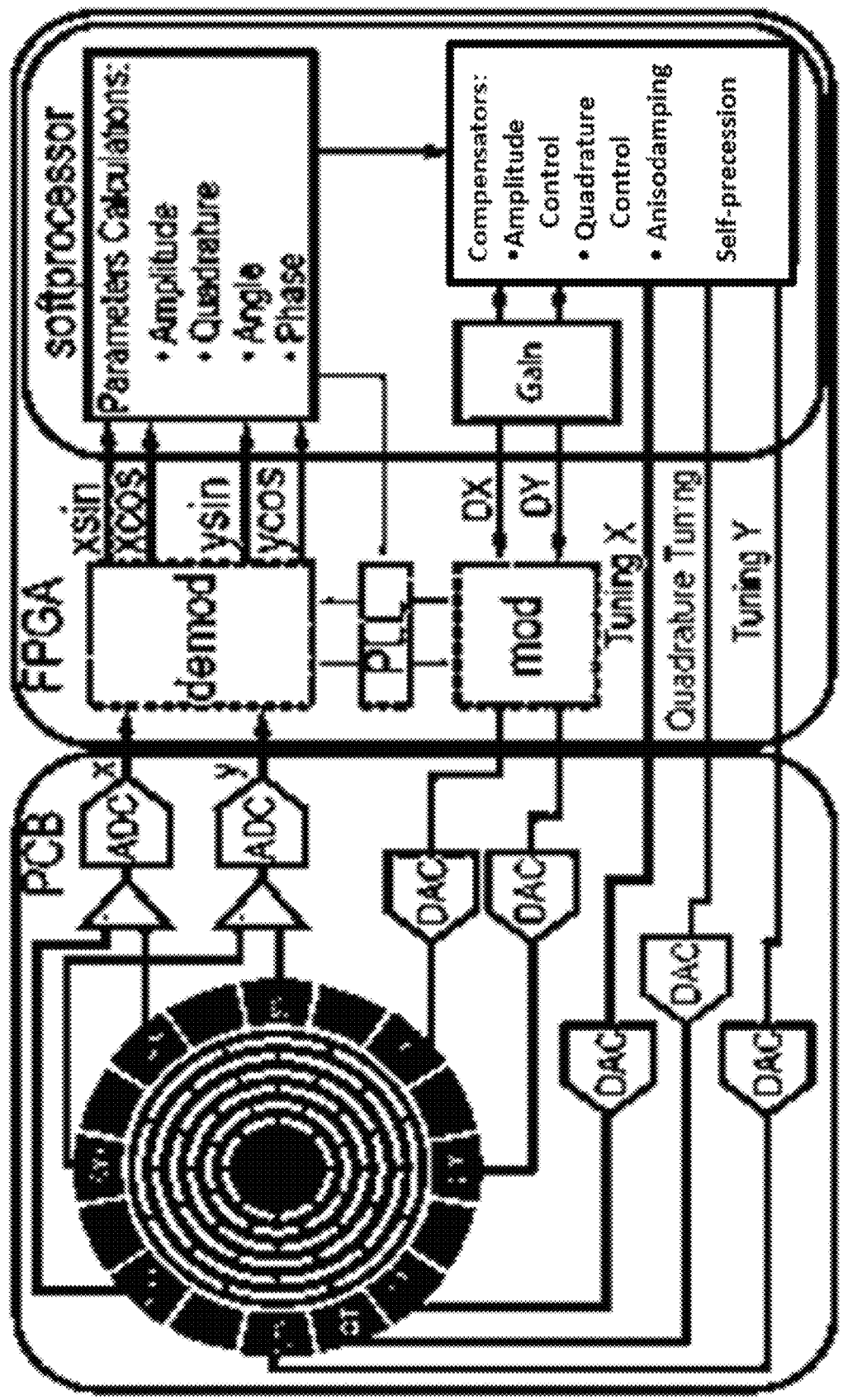
FIG. 6A is a block diagram of an exemplary RIG controller operating in baseband.

The FPGA-based stand-alone platform presented above can be applied to baseband operation of the RIG. The block diagram of this platform is illustrated in FIG. 6A. The digital hardware including phase-lock loop, modulation, and demodulation can be implemented in an FPGA using Verilog programming language with reference clock of 200 MHz. The control algorithms can be implemented in a softprocessor embedded in the FPGA with a sampling rate of 1600 Hz. Example 16 bit DACs and ADCs have a sampling rate of 2 MHz.

Methods for open-loop anisoelasticity compensation are known. However; further closed-loop feedback control is needed to compensate for the residual anisoelasticity. The anisoelasticity error also known as quadrature can be quantified using the equation:

$$Q=2(x_c y_s - y_c x_s) \quad (3)$$

where, $x_c$ and $x_s$ are in-phase and quadrature portions of the X axis resonance mode signal after demodulation and $y_c$ and $y_s$ are in-phase and quadrature portions of the Y axis. The anisodamping error and its compensation will be discussed hereafter.

In addition to closed-loop controller used to null anisoelasticity, a closed-loop energy controller can be used to control the oscillation amplitude. The energy is calculated by:

$$E=x_c^2+x_s^2+y_c^2+y_s^2 \quad (4)$$

Figure 6C:
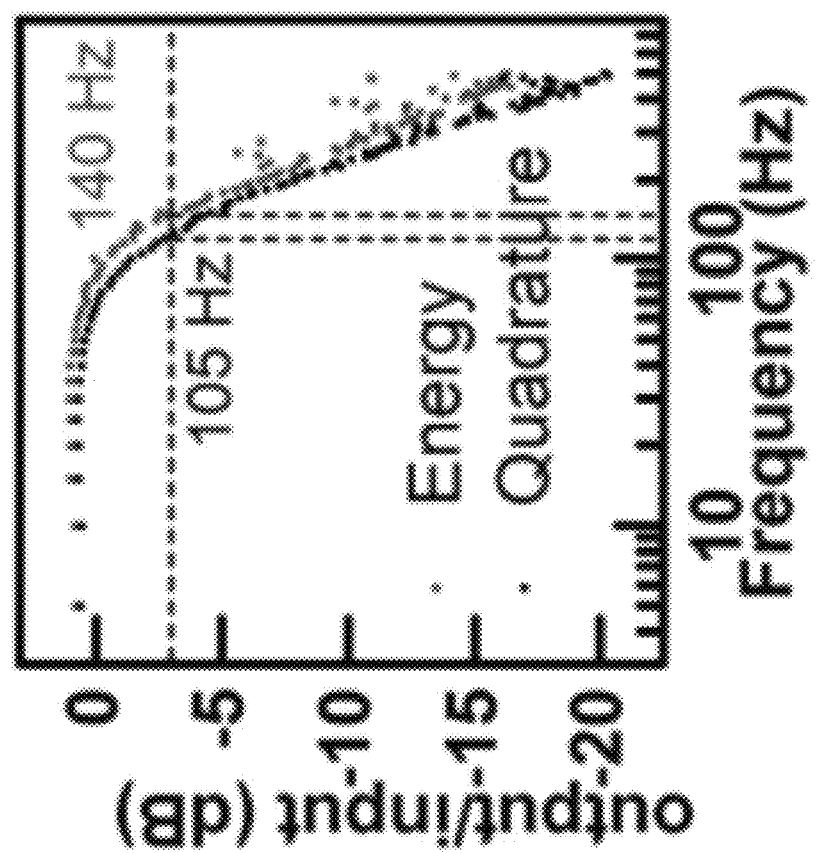
FIG. 6C is a plot of example measured bandwidths of the energy controller (140 Hz) and the quadrature controller (105 Hz)
Figure 6B:
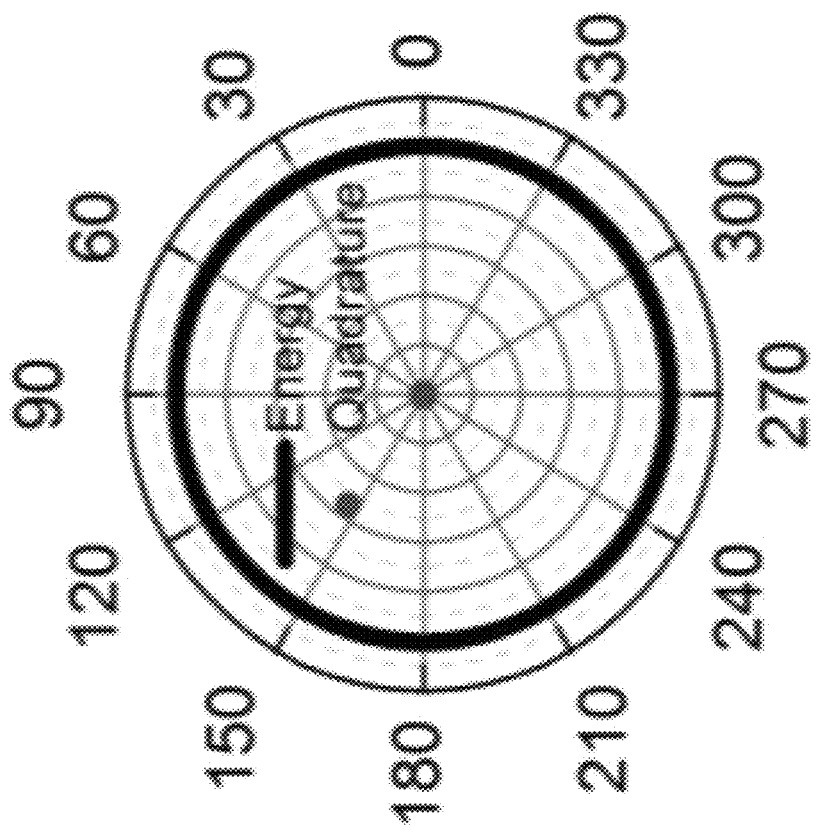
FIG. 6B is a graph of example measured controller performance where energy is controlled at an amplitude of 70 nm, and the Q/E ratio is 0.004.

The implementation of closed-loop controllers on quadrature and energy, result in measured stabilized quadrature and energy for all angles illustrated in FIG. 6B. An example measured bandwidth of the controllers is illustrated in FIG. 6C, respectively showing a BW of 140 Hz and 105 Hz.

To compensate for anisodamping error a modified angle dependent controller can be used. The modified equation is:

$$\begin{bmatrix} F_{Ex} \\ F_{Ey} \end{bmatrix} = \left[ k_p(E_0 - E) + k_I \int (E_0 - E)dt \right] G \begin{bmatrix} \cos\theta \\ \sin\theta \end{bmatrix} \quad (5)$$

$$G = I + \delta_\tau \begin{bmatrix} -\cos\theta_\tau & \sin\theta_\tau \\ \sin\theta_\tau & \cos\theta_\tau \end{bmatrix} \quad (6)$$

where equation (5) is the PI controller if G is an identity matrix. In this equation $E_0$ is energy set point, $k_p$ and $k_I$ are the controller gains, and $F_{Ex}$ and $F_{Ey}$ are in-phase force amplitudes to control the energy of the resonator in X and Y modes, and θ is the angle (sensor's output). Equation (6) shows the modified matrix G in which $\delta_\tau$ (anisodamping error) and $\theta_\tau$ (primary axis of damping) is used to calculate its value.

The anisodamping error can be characterized through several tests. Here a method is used by applying a rate to calculate the anisodamping value and primary axis of damping. Due to existence of anisodamping, the angle precession measured from gyroscope includes 2θ angle dependent error. By subtracting a linear fit (FIG. 7A) from the rate output and performing Fourier analysis on the residual (FIG. 7B), the nθ components of the residual can be calculated. Also, frequency sweeps in both X and Y axis can confirm an approximately 13.3% difference in quality factor and approximately 12% difference in gain of each axis due to transducer electrode gap difference and amplifiers gains.

Figure 8:
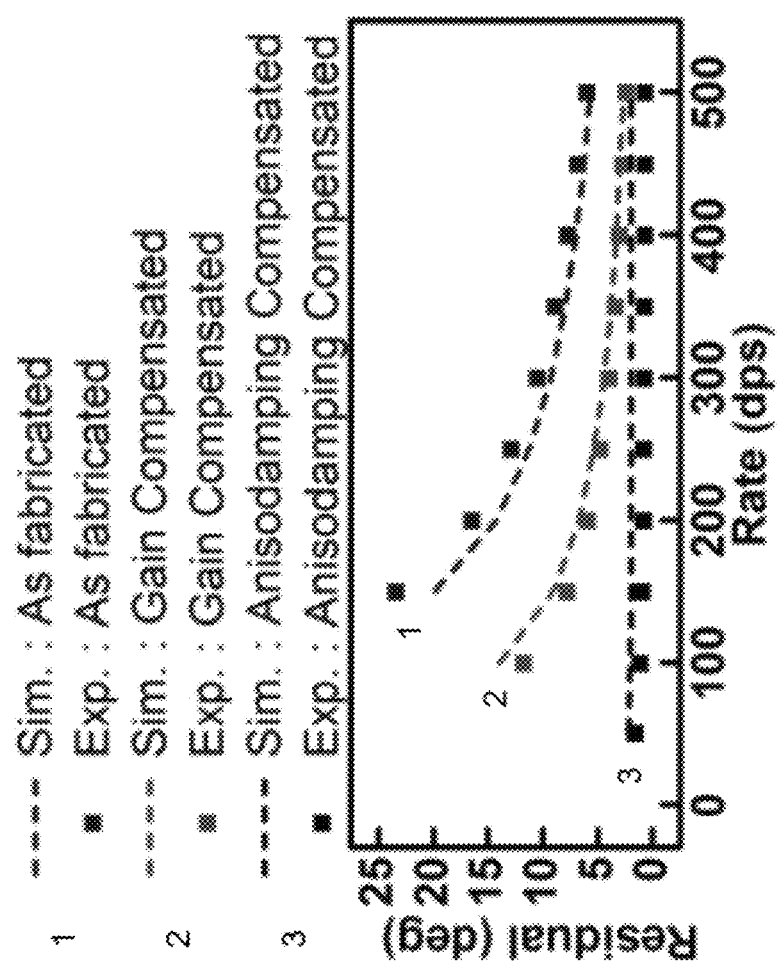
FIG. 8 is a plot of example measured and simulated rate dependence of the residual error: as-fabricated gyro, gain compensated, and anisodamping compensated.

After implementation of compensation for anisodamping and gain difference due to transducer electrode gap difference and amplifiers gains, the RIG can be tested under rate from a rate table for three different conditions as shown in FIG. 8. FIG. 8 shows the angle dependency of the residual error calculated using the method presented in FIGS. 7A-7C, and the measurements can be compared with simulation models made using a modified version of a base-band model, showing a significant reduction in residual error.

7.B. Phase-Locked loop (PLL)

The reference signal for phase-locked loop (PLL) which can be used with embodiments of the invention, is a combination of signals from axis X and axis Y. The signals of the feedback loop to the PI controller of the PLL are shown in equation (7) and (8), $L_s$ being the quadrature and $L_c$ being in phase portions of L signal:

$$L_s=2(x_c x_s + y_c y_s) \quad (7)$$

$$L_c=x_c^2-x_s^2+y_c^2-y_s^2 \quad (8)$$

Figure 9A:
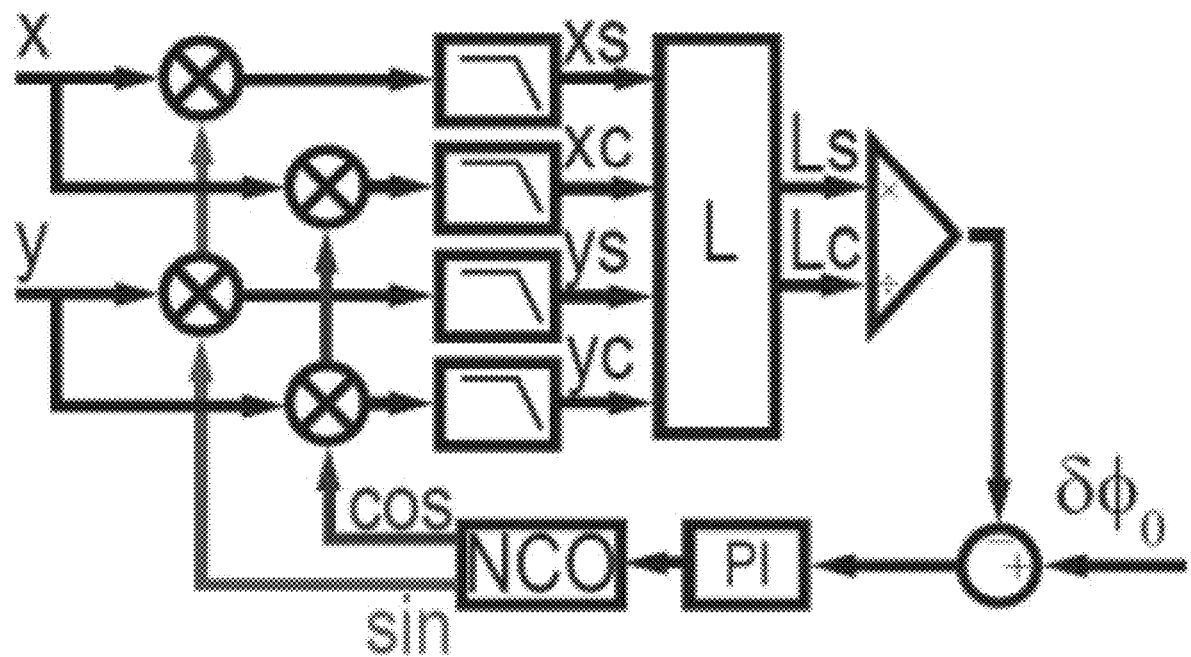
FIG. 9A is a block diagram of example PLL logic.
Figure 9B:
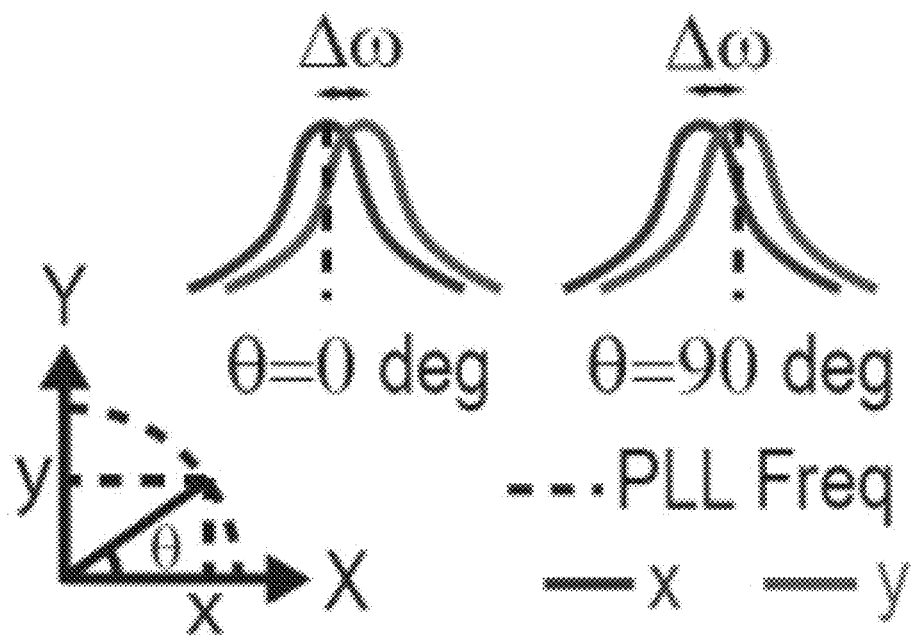
FIG. 9B illustrates example PLL Frequency changes between ω1 and ω2 depending on the angle.
Figure 9D:
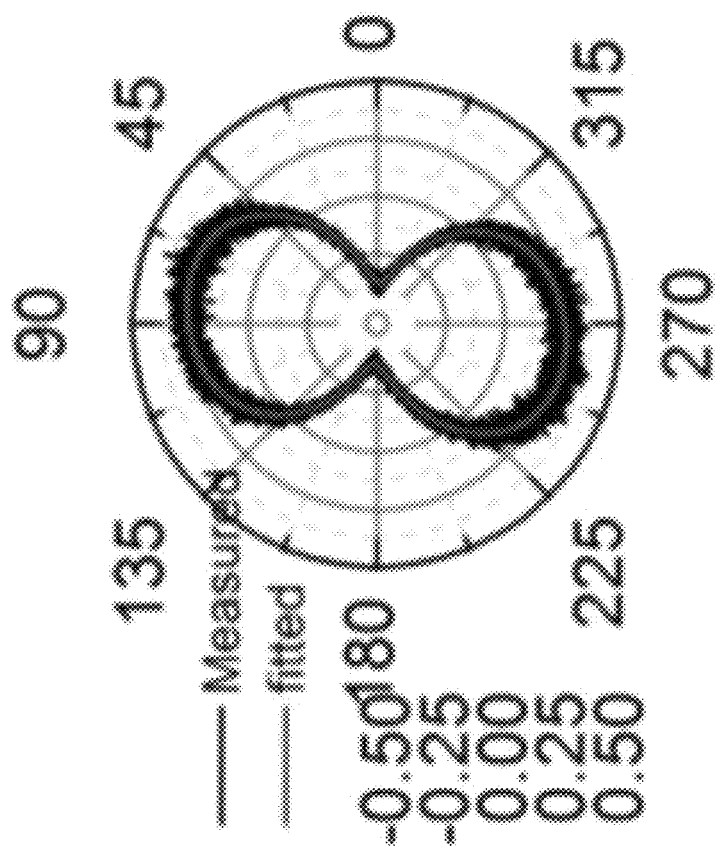
FIGS. 9C and 9D illustrate the frequency offset from PLL center frequency, showing a 0.63 Hz difference between the two resonance modes of the gyroscope.
Figure 9C:
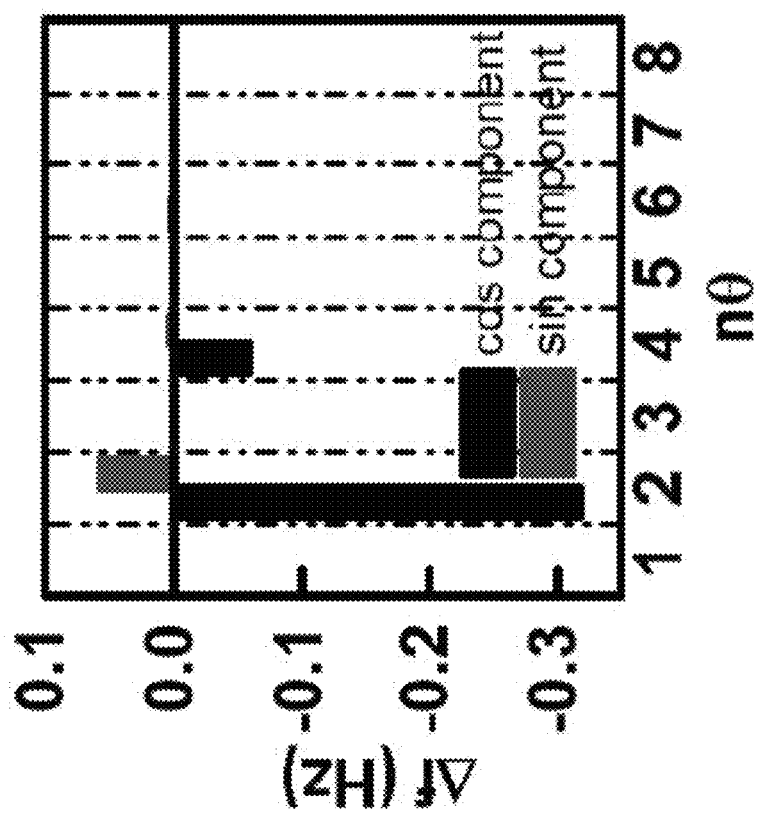

With this reference signal, the PLL will lock to a signal allowing 360 degree rotation. The PLL block diagram is illustrated in FIG. 9A. Employing such a PLL can create an angle dependent frequency of oscillation which will exchange between resonance of X and Y (FIG. 9B). By looking at the frequency of the NCO as the gyroscope rotates, the frequency of the modes can be extracted. FIGS. 9C and 9D illustrate the frequency offset from PLL center frequency, showing a 0.63 Hz difference between the two resonance modes of the gyroscope. The 2θ components the amplitude and also direction of the maximum and minimum resonances aligned with X and Y axes.

7.C. Quadrature Error

By measuring the effort needed to cancel the quadrature the primary axis of stiffness can be measured. The quadrature cancellation effort should follow a 2θ dependency as illustrated in FIG. 10A. Using Fourier series fit (shown in FIG. 10B), the primary axis of stiffness is measured to be approximately 81.1° (as shown in FIG. 10C). This method of characterization of quadrature can be used to compensate for all anisoelasticity using full position matrix feedback control in the same manner presented here to compensate for anisodamping.

7.D. Self-Precession

For further characterization of the gyroscope performance, a method of self-precession rate can be used, in which the gyro's vibration pattern is precessed at a constant rate by applying in in-phase forces to the X and Y axes. After re-modulation, these forces amount to antisymmetric velocity feedback at the resonator's natural frequency under a generalized view of RIG operation and control. The modified energy control equation selected to apply this approach with our baseband controller is presented in Equation (9):

$$\begin{bmatrix} F_{Ex} \\ F_{Ey} \end{bmatrix}^{(2)} = \begin{bmatrix} F_{Ex} \\ F_{Ey} \end{bmatrix} + A_{SP} \begin{bmatrix} 0 & -1 \\ 1 & 0 \end{bmatrix} \cdot \begin{bmatrix} \cos\theta \\ \sin\theta \end{bmatrix} \quad (9)$$

where $A_{SP}$ is the amplitude of the force applied to create the self-precession rate. One benefit of using this method is that the noise sources coming from rate table (e.g. vibration and electromagnetic interference) are eliminated and the applied rate may exceed the limits of the rate table. Significantly, the minimum rate threshold or rate bias can be greatly reduced or eliminated.

Figure 11C:
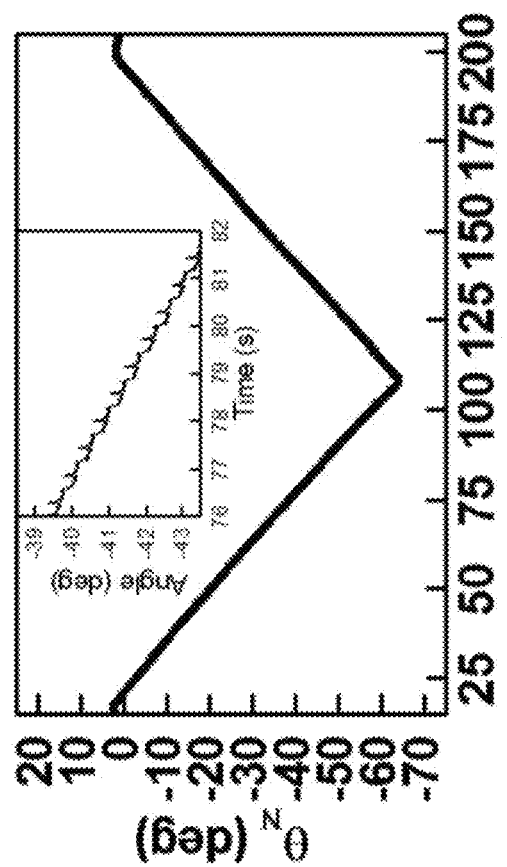
FIG. 11C is an example plot showing net precession, $\theta_N = AG \cdot \theta_T = -\theta - AG \cdot \theta_S$ due to inertial rate input of only $\theta$ rate=1 dps after calculated self-precession, $\theta_S$ is subtracted from measured (total) precession, $\theta$.
Figure 11B:
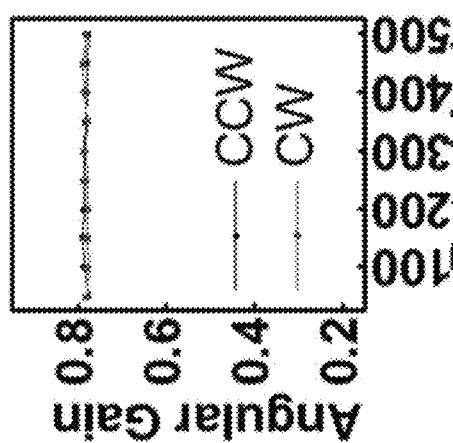
FIG. 11B is an plot showing example measured angular gain of a RIG with fixed 725 dps self-precession rate for different rate table speeds.
Figure 11A:
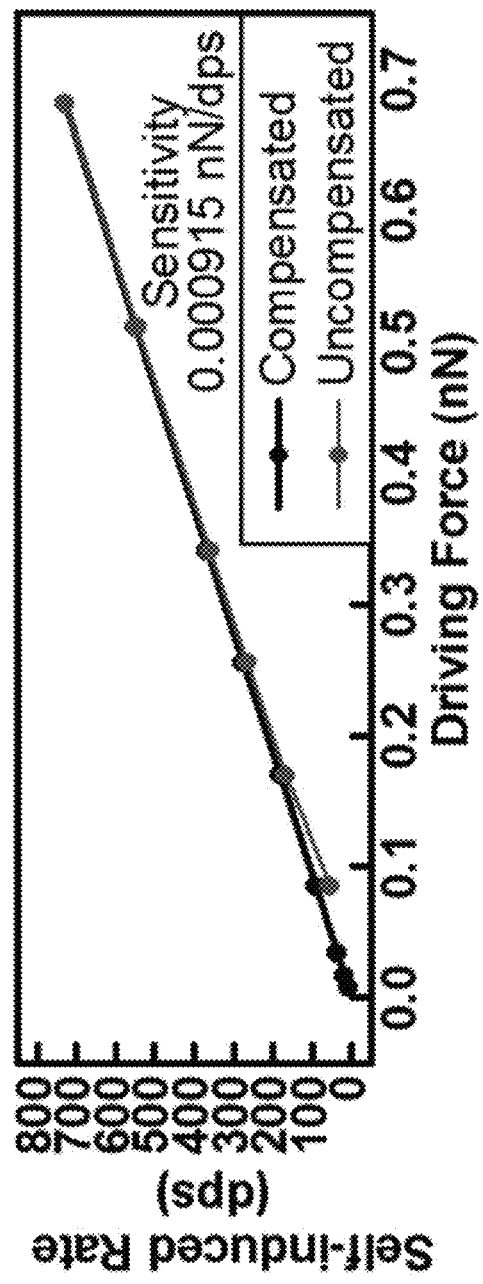
FIG. 11A is an example plot for self-precession calibration, showing a linear behavior and sensitivity of 0.000915 nN/dps for 70 nm amplitude oscillation.

FIG. 11A illustrates the calibration done with the DRG driven at an amplitude of 70 nm and varying levels of ASP, resulting in a force sensitivity of approximately 0.000915 nN/dps. This self-precession test can be performed for compensated and uncompensated RIG, showing a nonlinearity in uncompensated operation resulting from anisodamping error. In addition, the minimum rate in which the RIG can self-precess can be characterized using this method, resulting in approximately 100 dps for uncompensated and approximately 3.5 dps for compensated versions showing comparable results to the recent results of 2.5 dps on a much lower frequency device. However, in terms of compensation effectiveness it should be noted that this result represents a significant 30× reduction in anisodamping which appears an order of magnitude more effective. This performance can also be confirmed using rate table tests showing a 3.5 dps minimum precession rate. To overcome this compensation residual, an operational self-precession rate of 725 dps can be implemented on the gyroscope and the gyroscope tested on a rate table. After applying rates from 50 dps to 500 dps in both directions for 10 full rotations, the offset of 725 dps self-precession rate can be subtracted from the gyroscope output resulting in a direct angle measurement. The angular gain, AG, which can be measured in this operation is plotted in FIG. 11B, the same as measured for operation without any self-precession rate. To show the benefit of a RIG operating with self-precession, an inertial rate of 1 dps (previously undetectable by the gyroscope) in both directions, each for 90 seconds, can be measured for the first time (shown in FIG. 11C). A RIG operated with self-precession can detect input rates below its compensation residual potentially eliminating rate bias due to anisotropy.

7.E. Noise Limits

Figure 12A:
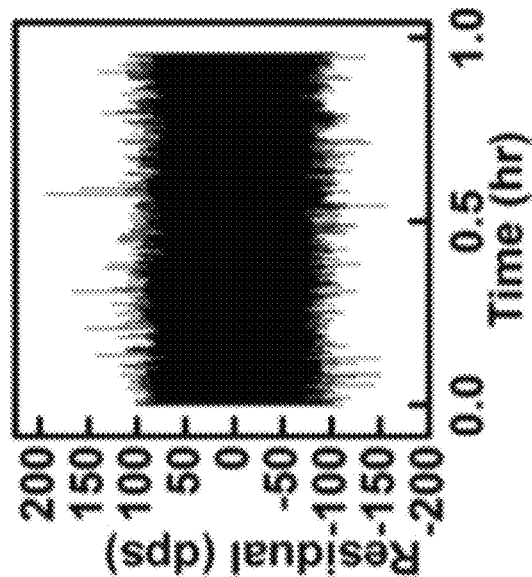
FIG. 12A is an example plot of residual and residual after subtracting the first 8 harmonics.
Figure 12B:
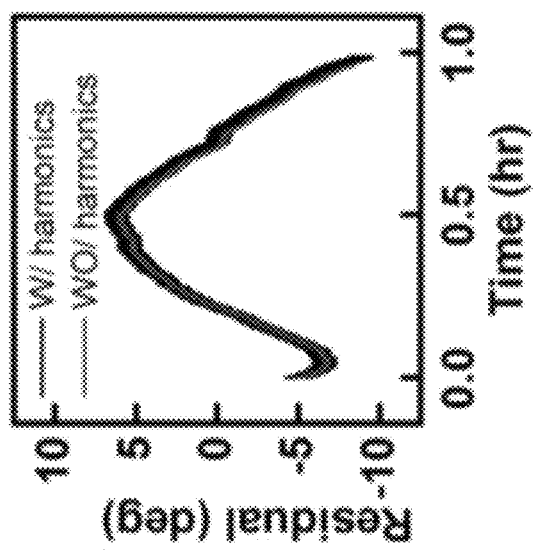
FIG. 12B is an example plot of residual in dps.
Figure 12C:
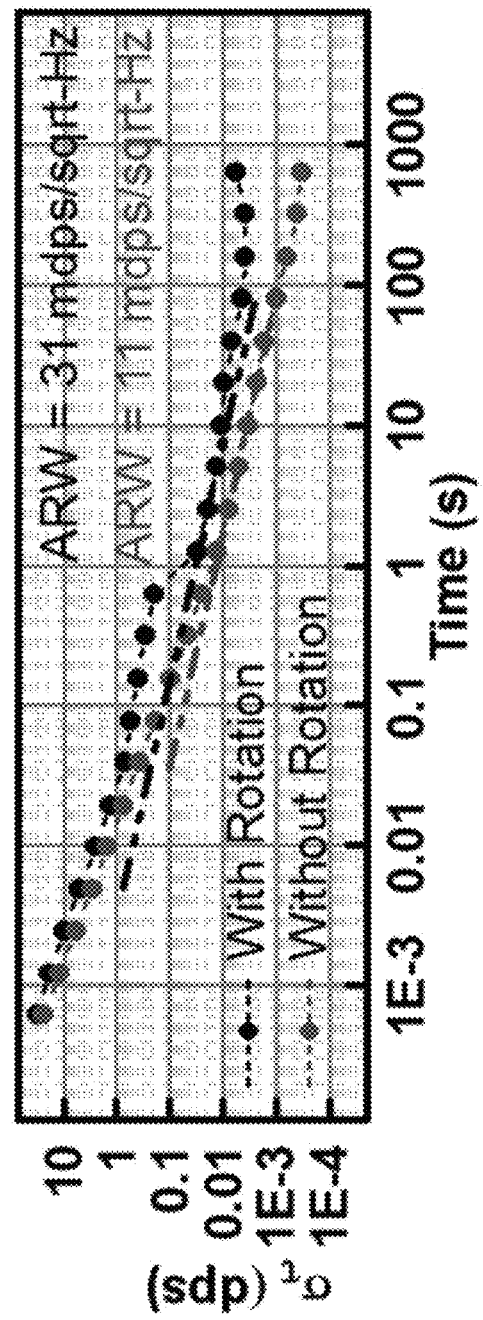
FIG. 12C is an example Allan deviation plot of RIG for operation under rate and operation without rate.

Thus, for the first time embodiments of the present invention afford a technique to measure the noise performance of a RIG, similar to RG, in anticipation of its graduation to zero rate threshold operation. The measurement can be performed with rate or without rate. In the measurement with rate, data can be collected for one hour under rotation of 360 dps. To calculate the noise, the residual of angle change measured can be fitted using Fourier series, and the residuals subtracted as shown in FIG. 12A. Using numerical derivation, the rate can be calculated as shown in FIG. 12B, and Allan deviation can be performed on the result as shown in FIG. 12C. Furthermore, the Allan deviation of the output of the gyroscope after integration can also be calculated resulting in an ARW of 11 mdps/4 Hz, the same as the ARW of the gyroscope in rate mode at the same drive amplitude. A comparison of the data shows higher noise when rate is applied due to the noise from rate table and also some singularities in fixed-point math calculations; inside the softprocessor some low frequency (<10 Hz) variation is introduced in the output which results in higher ARW.

Thus, an improved MEMS disk resonator gyroscope in rate integrating mode operation can be achieved employing embodiments of the present invention. MEMS resonator gyroscopes suffer from anisoelasticity and anisodamping errors. Embodiments of the invention using a non-unity matrix in the energy control feedback loop, compensate for anisodamping and can effectively decrease the rate threshold by as much as 30× to 3.5 dps. To eliminate any rate threshold due to residual anisotropy, a method of RIG operation with self-precession can be employed. Using this method, a consistent scale factor and a rate measurement for 1 dps inertial rate, which is below its anisotropic rate threshold with conventional RIG, can be achieved. In addition, noise limits of the RIG employing embodiments of the invention can approach the same thermal noise limits as in RG mode using the same MEMS and electronics.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. For example the sense transducer outputs can be digitized with an ADC and the antisymmetric velocity feedback computed digitally and output through a digital-to-analog converter to drive the resonator via the force transducer gain. Additional variations of the present invention may be devised without departing from the inventive concept as set forth in the following claims.

What is claimed is:

1. A gyroscope comprising:
   a resonator having a defined self-precession rate of a vibration pattern of the resonator; and
   readout electronics coupled to the resonator for generating the defined self-precession rate of the vibration pattern of the resonator, the readout electronics measuring a total precession rate of the resonator, and subtracting the defined self-precession rate of the vibration pattern of the resonator from the measured total precession rate to yield an inertial rate output;
   wherein the readout electronics compute feedback forces to induce the defined self-precession rate and compensate for the residual asymmetry at baseband and the feedback forces are applied at a resonator frequency in phase with resonator velocity.

2. The gyroscope of claim 1, wherein a force signal of the feedback forces are modulated up to the resonator frequency by the readout electronics using a reference frequency generator that tracks a phase of the resonator comprises a phase lock loop.

3. The gyroscope of claim 1, wherein a velocity amplitude of the resonator is regulated to a fixed value and the magnitude of the feedback force that induces the defined self-precession rate and is in phase with resonator velocity is also a fixed value with feedback force components determined from a precession angle digitally computed by the readout electronics at baseband.

4. The gyroscope of claim 1, wherein the defined self-precession rate is defined by a measurement of actual precession rate of the resonator with zero inertial rate input.

5. The gyroscope of claim 1, wherein the readout electronics generate the sufficient precession force employing analog electronic feedback including amplitude and quadrature control.

6. The gyroscope of claim 1, wherein the readout electronics reverse a direction of the defined self-precession rate.

7. The gyroscope of claim 6, wherein reversal of the direction of the defined self-precession rate is performed periodically.

8. The gyroscope of claim 6, wherein reversal of the direction of the defined self-precession rate is performed based on the resonator reaching a threshold precession angle.

9. The gyroscope of claim 1, wherein the readout electronics correct common mode damping and stiffness over temperature and time employing substantially fixed electronic feedback correction of damping asymmetry parameters and stiffness asymmetry parameters.

10. The gyroscope of claim 1, wherein the readout electronics include an intermediate frequency processor for control offset correction, residual asymmetry parameter identification for analog feedback gain correction and electrostatic tuning bias correction and compensated digital inertial rate output.

11. A method of operating a gyroscope comprising:
providing a resonator able to precess a vibration pattern of the resonator with a defined self-precession rate;
generating the defined precession rate of the vibration pattern of the resonator with readout electronics coupled to the resonator;
measuring a total precession rate of the resonator; and
subtracting the defined self-precession rate of the vibration pattern of the resonator from the measured total precession rate to yield an inertial rate output;
wherein the readout electronics compute feedback forces to induce the defined self-precession rate and compensate for the residual asymmetry at baseband and the feedback forces are applied at a resonator frequency in phase with resonator velocity.

12. The method of claim 11, wherein a force signal of the feedback forces are modulated up to the resonator frequency by the readout electronics using a reference frequency generator that tracks a phase of the resonator comprises a phase lock loop.

13. The method of claim 11, wherein a velocity amplitude of the resonator is regulated to a fixed value and the magnitude of the feedback force that induces the defined self-precession rate and is in phase with resonator velocity is also a fixed value with feedback force components determined from a precession angle digitally computed by the readout electronics at baseband.

14. The method of claim 11, wherein the defined self-precession rate is defined by a measurement of actual precession rate of the resonator with zero inertial rate input.

15. The method of claim 11, wherein the readout electronics generate the sufficient precession force employing analog electronic feedback including amplitude and quadrature control.

16. The method of claim 11, wherein the readout electronics reverse a direction of the defined self-precession rate.

17. The method of claim 16, wherein reversal of the direction of the defined self-precession rate is performed periodically.

18. The method of claim 16, wherein reversal of the direction of the defined self-precession rate is performed based on the resonator reaching a threshold precession angle.

19. The method of claim 11, wherein the readout electronics correct common mode damping and stiffness over temperature and time employing substantially fixed electronic feedback correction of damping asymmetry parameters and stiffness asymmetry parameters.

20. The method of claim 11, wherein the readout electronics include an intermediate frequency processor for control offset correction, residual asymmetry parameter identification for analog feedback gain correction and electrostatic tuning bias correction and compensated digital inertial rate output.

* * * * *